Jan. 13, 1953      J. HERMAN      2,624,886
SEAM FOR TARPAULIN OR OTHER WATERPROOF FABRIC
Filed Nov. 12, 1948
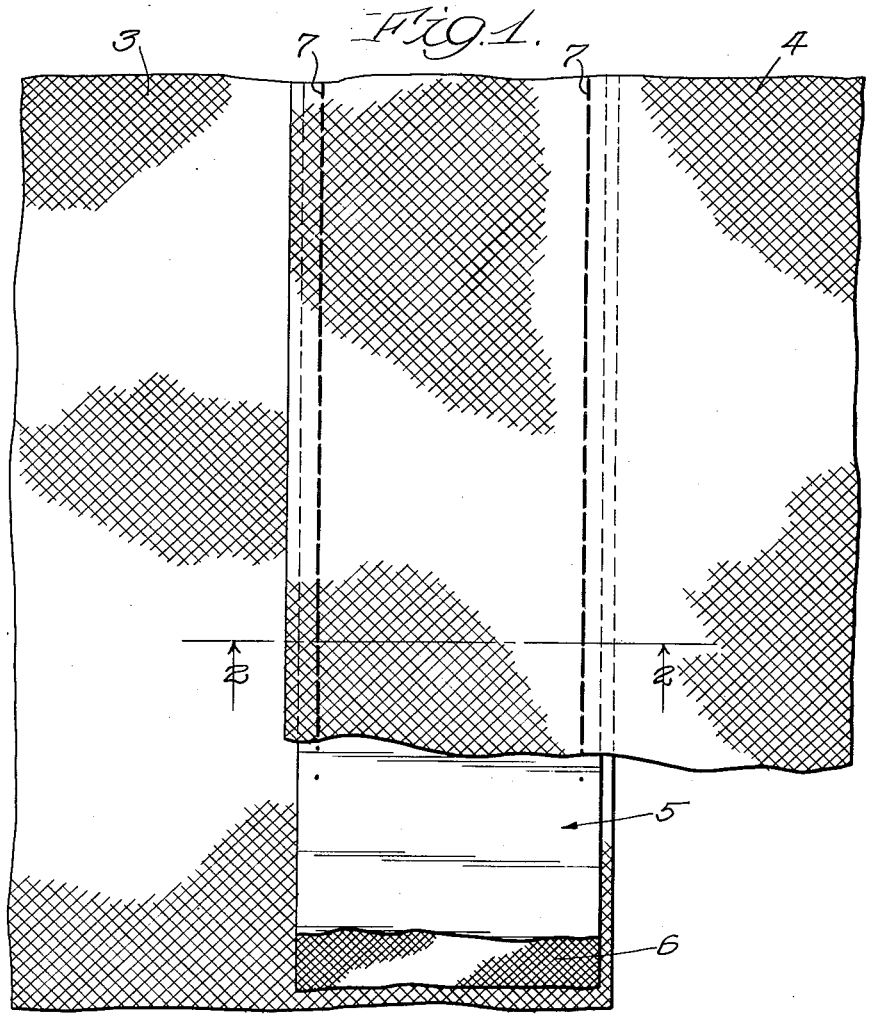
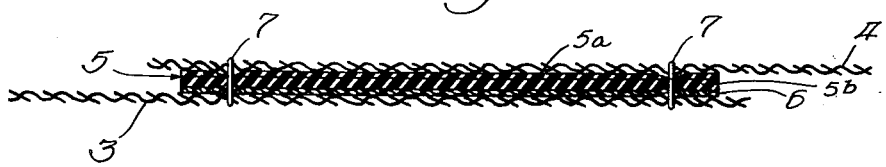
Inventor:
John Herman,
By Chitton, Schroeder,
Merriam, Hofgren, Attys Patented Jan. 13, 1953

2,624,886

UNITED STATES PATENT OFFICE 2,624,886

SEAM FOR TARPAULIN OR OTHER WATERPROOF FABRIC

John Herman, Chicago, Ill., assignor to J. W. Johnson Company, Chicago, Ill., a corporation of Illinois Application November 12, 1948, Serial No. 59,634

4 Claims. (Cl. 2—276)

This invention relates to an improved waterproof fabric object, such as a tarpaulin, a tent, or the like, and method of making it, and in particular it relates to an improved waterproof fabric object in which the seams are sealed against leakage around the stitching.

In the making of waterproof fabric objects, and in particular tarpaulins, it is customary to employ a plurality of pieces of heavy waterproofed material, such as canvas, and the seams of a tarpaulin are customarily simple lap seams with a double line of stitching securing the lapped edges together.

It is obvious that in stitching the seam, either by hand or with a sewing machine, the needle holes which are necessarily in register in the lapped layers of fabric leave numerous small holes through which water can pass, particularly where there is standing water on the surface of the tarpaulin.

I have discovered that the common lap seam in a tarpaulin may be rendered waterproof by placing a sealing strip composed of a malleable solid elastomer between the overlapping edge portions of the fabric and stitching through the elastomer. Pressure may then be applied to the completed seam, preferably with rollers, so that the elastomer is pressed close about the threads so that its malleability causes it to form a watertight seal around the thread and seal the needle holes. The term "malleable" is employed herein to indicate that the elastomer is so soft and unresilient that it may be permanently deformed under pressure, so that the material under pressure will press close against, and form a watertight seal around, the thread, and then stay there after the pressure is taken off.

The commercially available malleable solid elastomers which are suitable for this purpose have a strengthening member bonded to one surface, as otherwise the elastomer tends to stretch as it passes through the stitcher head of a sewing machine. In order that the elastomer may be properly malleable under pressure, the strengthening member must be an unsized material, such as cheesecloth or lightweight sheeting, so as to be freely torsionable in the plane of its surface.

The improved tarpaulin is shown in the accompanying drawings in which Fig. 1 is a plan view of a portion of a seam partially in section; and Fig. 2 is a sectional view of the seam taken as indicated at 2—2 of Fig. 1.

Referring to the drawings in greater detail, a first piece of waterproof fabric 3 and a second piece of waterproof fabric 4 are secured with their adjacent edge portions in parallel overlapping relationship. A continuous sealing strip 5 of a malleable solid elastomer having an unsized cloth strengthening member 6 secured to one of its surfaces is placed between the overlapping edge portions of the fabric pieces 3 and 4. It has a layer 5a of vulcanized rubber and a layer 5b of an unvulcanized rubber on which is bonded the member 6. Suitable sealing strips are commercially available and are formed of unvulcanized, plasticized rubber or rubber substitute, having a strip of cheesecloth bonded to one surface. It is important that the cloth strengthening member be unsized in order that it may be freely torsionable in the plane of its surface so as to permit the elastomer to be freely malleable under pressure after a seam has been formed. Sized cloth prevents proper forming of the elastomer.

A suitable commercially available sealing tape is .029 inch thick, and is fabricated from two different types of plasticized rubber compounds bonded together, there being a layer of unvulcanized rubber compound .014 inch thick, a layer of vulcanized compound .010 inch thick, and a strengthening member of 38½ inch 5.35 unsized sheeting applied to the outside of the unvulcanized layer to make up the balance of the .029 inch thickness. A suitable sealing strip is available from United States Rubber Company as its "Special D. R. Tape with Unfrictioned Separator."

Threads 7 are used to stitch the seam forming edges together, the common commercial sewing machine for such heavy stitching being either of the double chain stitch or lock stitch variety.

Alternatively, two narrow sealing strips may be employed—one under each of the lines of stitching 7.

After the stitching operation is completed, it is necessary that the sealing strip be subjected to sufficient pressure to press the malleable elastomer close around the threads so as to seal the needle holes.

In commercial production the improved seam is ordinarily formed by running the two pieces of fabric with the sealing strip 5 therebetween continuously through the stitcher head of a commercial sewing machine which has a pair of needles to simultaneously form the two parallel lines of stitching 7. A suitable fabric guide for performing the method commercially is illustrated in my copending application, Serial No. 59,633, filed November 12, 1948.

The commercial sewing machines ordinarily have a driven roller located behind the stitcher head to draw the fabric through the machine, and this roller may advantageously be employed as a presser roll to press the elastomer about the threads in such a continuous operation. Such rollers normally are provided with large tooth-like ribs to grip the fabric; but if they are to be used as a presser roll they must be only lightly scored or knurled so as to exert substantially uniform pressure on all parts of the stitching, as is more fully set out in said copending application.

The foregoing detailed description has been given for clearness of understanding only and no unnecessary limitations should be understood therefrom, as variations will be obvious to those skilled in the art.

I claim:

1. A waterproof fabric article comprising: a plurality of pieces of waterproof fabric, the adjoining edge portions of any pair of said pieces being stitched in overlapping relationship with a thread; and a sealing strip of a solid elastomer between said overlapping edge portions and pierced by said thread, said elastomer being malleable under pressure in the solid state at ambient temperature and having bonded on at least one face a sheet of strengthening material which is freely torsionable in the plane of its surface, and said elastomer being compressed close around the thread so that its malleability causes it to form a watertight seal therearound, said article being characterized by a complete absence of elastomer in the needle holes in the waterproof fabric, in the interstices of said fabric, and in the plies of the thread.

2. The article of claim 1 in which the strengthening material is unsized cheesecloth.

3. The article of claim 1 in which the elastomer is a plasticized, unvulcanized rubber compound.

4. In a tarpaulin or other waterproof fabric article, a lap seam including a stitching thread which extends through the overlapping edge portions of two pieces of waterproof fabric, there being between said edge portions and traversed by said thread a sealing strip of a solid elastomer which is malleable under pressure in the solid state at ambient temperature and which has on at least one face a sheet of strengthening material which is freely torsionable in the plane of its surface, said article being characterized by the fact that the elastomer is compressed close around the thread so that its malleability causes it to form a watertight seal therearound, and being further characterized by a complete absence of elastomer in the needle holes in the waterproof fabric, in the interstices of the fabric, and in the plies of the thread.

JOHN HERMAN.

REFERENCES CITED

The following references are of record in the file of this patent:

UNITED STATES PATENTS

| Number | Name | Date |
|---|---|---|
| 1,073,858 | Kaufman | Sept. 23, 1913 |
| 1,560,712 | Naylor | Nov. 10, 1925 |
| 1,725,749 | Blair | Aug. 27, 1929 |
| 2,465,374 | Haman et al. | Mar. 29, 1949 |

FOREIGN PATENTS

| Number | Country | Date |
|---|---|---|
| 354,131 | Great Britain | Aug. 6, 1931 |